(12) United States Patent  (10) Patent No.: US 6,594,423 B2
Sakamoto et al.  (45) Date of Patent: Jul. 15, 2003

(54) FIBER TYPE OPTICAL COMPONENT

(75) Inventors: Akira Sakamoto, Sakura (JP); Satoshi Okude, Sakura (JP); Sudo Masaaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/225,812

(22) Filed: Aug. 21, 2002

(65) Prior Publication Data

US 2003/0063857 A1 Apr. 3, 2003

(30) Foreign Application Priority Data

Aug. 31, 2001  (JP) ........................................ 2001-265053

(51) Int. Cl.$^7$ ................................................ G02B 6/34
(52) U.S. Cl. ........................................ 385/37; 385/124
(58) Field of Search ............................... 385/24, 33–37, 385/121–123, 124, 147; 372/6

(56) References Cited

U.S. PATENT DOCUMENTS

| | | | |
|---|---|---|---|
| 5,305,335 A | * 4/1994 | Ball et al. | 372/6 |
| RE35,962 E | * 11/1998 | Ball et al. | 372/6 |
| 6,005,999 A | * 12/1999 | Singh et al. | 385/37 |
| 6,292,606 B1 | * 9/2001 | Riant et al. | 385/37 |
| 6,314,221 B1 | * 11/2001 | Riant et al. | 385/37 |
| 6,321,008 B1 | * 11/2001 | Riant et al. | 385/37 |
| 6,535,678 B1 | * 3/2003 | Yamauchi et al. | 385/123 |

FOREIGN PATENT DOCUMENTS

| | | | | |
|---|---|---|---|---|
| CA | 2201193 | * | 1/2000 | G02B/5/18 |
| EP | 0582860 | * | 2/1994 | H01S/3/06 |
| EP | 0984306 | * | 3/2000 | G02B/6/16 |
| EP | 1035425 | * | 9/2000 | G02B/6/10 |
| JP | 9-274115 | * | 10/1997 | G02B/6/12 |
| JP | 9-325227 | * | 12/1997 | G02B/6/122 |
| JP | 9-325229 | * | 12/1997 | G02B/6/122 |
| JP | 11-160554 | * | 6/1999 | G02B/6/10 |
| JP | 11-305051 | * | 11/1999 | G02B/6/10 |
| JP | 2000-89045 | * | 3/2000 | G02B/6/10 |
| JP | 2001-51134 | * | 2/2001 | G02B/6/10 |
| JP | 2001-154042 | * | 6/2001 | G02B/6/10 |
| JP | 2001-203415 | * | 7/2001 | H01S/3/10 |

* cited by examiner

Primary Examiner—Akm Enayet Ullah
(74) Attorney, Agent, or Firm—Darby & Darby (57) ABSTRACT

A fiber type optical component in which nonuniform increase of refractive index is restricted to a minimum in an optical fiber to which light sensitive material is added to the cladding section and the cladding section of the optical fiber, by forming the optical fiber such that the outermost diameter of the light sensitive layer of the optical fiber is twice as large as the mode field diameter or more, or more preferably 2.5 times as large as the mode field diameter, and by forming slant type optical fiber grating by this optical fiber, it is possible to realize the fiber type optical component in which the bandwidth of transmittance loss is narrow and steep in the reflection restricting angle with filtering ability having large transmittance loss.

9 Claims, 10 Drawing Sheets

FIBER TYPE OPTICAL COMPONENT

BACKGROUND OF THE INVENTION

1. Field of the Invention

The present invention relates to an optical fiber which is used as an optical component and a fiber type optical component using the optical fiber. The present invention particularly relates to a fiber type optical component made by enhancing the refractive index by emitting light from the side direction of the fiber.

2. Description of Related Art

Various optical components made by adding material having light sensitivity to optical fibers and emitting light according to the light sensitive material so as to alter the refractive index are produced for practical use. Here, the light sensitivity is a property in which the refractive index is altered by emission of light. As an example, an optical fiber grating may be mentioned. An optical fiber grating is made by adding a predetermined periodical perturbation to the area where the light of the optical fiber is transmitted. Usually, such a perturbation can be indicated by alteration of the refractive index. This periodic alteration of the refractive index is commonly obtained by adding the material having light sensitivity on the optical fiber and emitting light on the optical fiber according to the light sensitivity of the material. In order to obtain such a periodic refractive index, a holographic method, phase mask method, step-by-step method or the like are commonly employed.

The refractive index of the section where the light sensitive material is applied is enhanced by absorbing the emitted light. That is, the intensity of the emitted light decreases when the emitted light passes the area where the light sensitive material is added. Therefore, in above mentioned methods in which the light is emitted from the side of the optical fiber, the refractive index on the emitted side may easily increase, and the increase of refractive index is restricted on the opposite side; thus, there was a concern that uniform increase of the refractive index cannot be obtained in the cross section of the optical fiber. However, conventionally, the light sensitive material was applied only on the core section of the optical fiber, and the outer diameter of the core section is as small as 10 µm at maximum. Thus, the non-uniformity of the increase of the refractive index was not regarded as problem.

However, recently, it is required to form a grating by using a fiber to cladding of which light sensitive material is applied like a grating for restricting the combination with the cladding mode in the Bragg grating and the slant Bragg grating. In the case of such a fiber grating, when the outer diameter of the light sensitive layer which is added to the cladding decreases, the required characteristics cannot obtained; therefore, the outer diameter of the area where the light sensitive material is applied must be increased to as much as 20 µm or more.

In contrast, when the outer diameter of the light sensitive layer is increased and is too large, the increase of the refractive index near the core section may be restricted due to non-uniform increase of the refractive index and polarization dependence loss occurs in optical components. Thus, it was a problem that the influence caused by non-uniform refractive index cannot be ignored.

SUMMARY OF THE INVENTION

The present invention was made in consideration of such a situation. An object of the present invention is to obtain a fiber structure in which the required property is provided and the influence due to the non-uniform increase of the refractive index is minimized in the optical fiber to the cladding and the core of which the light sensitive material is applied. Also, it is an object of the present invention to provide the fiber type component using this optical fiber, particularly a grating type optical component.

In order to solve the abovementioned problems, the invention according to a first aspect is a fiber type optical component comprising a core, a cladding, a refractive index enhancing section, wherein the core and the cladding have light sensitivity, the refractive index enhancing section is formed by emitting ultraviolet light on an optical fiber, density of germanium in a layer having light sensitivity on the core and the cladding in the optical fiber satisfies formula 1 such as $$24[\mu m \cdot wt\ \%] < \sum_k \beta_k d_k < 100[\mu m \cdot wt\ \%]$$

and the amount of alteration of refractive index of the core and the cladding by the emission of ultraviolet light is less than 0.002 at of 674.9 nm wavelength. Here, in formula 1, $\beta_k$ is density of $GeO_2$ in each optical fiber layer, and the $d_k$ is thickness in the radius direction of each optical fiber layer.

The invention according to a second aspect is a fiber type optical component comprising, a core, a cladding, a refractive index enhancing section, wherein the core and the cladding have light sensitivity, the refractive index enhancing section is formed by emitting ultraviolet light on an optical fiber, a layer having light sensitivity on the core and the cladding in the optical fiber satisfies formula 2 such as $$0.35 < \exp\left(-2\sum_k \alpha_k d_k\right)$$

and the amount of alteration of the refractive index of the core and the cladding by the emission of ultraviolet light is less than 0.002 at of 674.9 nm wavelength. Here in formula 2, $\alpha_k$ is absorption coefficient in each optical fiber layer, and $d_k$ is thickness in the radius direction of each optical fiber layer.

By doing this, it becomes possible to realize a fiber type optical component in which non-uniform increase of the refractive index in the cross section of the optical fiber is small and good optical properties are obtained.

The invention according to a third aspect, in the fiber type optical component according to the first or the second aspect, is a fiber type optical component wherein the amount of change in the refractive index of the core and the cladding is less than 0.001 at of 674.9 nm wavelength.

The invention according to a fourth aspect, in the fiber type optical component according to the third aspect, is a fiber type optical component, wherein the diameter of the outermost layer on the optical fiber to which light sensitive material is applied twice as large as the diameter of mode field or more.

The invention according to a fifth aspect, in the fiber type optical component according to the fourth aspect is a fiber type optical component, wherein diameter of the outermost layer on the optical fiber to which the light sensitive material is applied 3 times as large as the diameter of the mode field or less.

By forming slant type optical fiber grating by using this optical fiber, it is possible to realize a fiber type optical component in which the filter property such that the transmission loss bandwidth is narrow and steep in reflex inhibiting angle and the transmission loss is large is obtained.

The invention according to a sixth aspect, in the fiber type optical component according to the fifth aspect, a fiber type optical component wherein the light sensitive material is germanium.

The invention according to an seventh aspect, in the fiber type optical component according to the sixth aspect, is a fiber type optical component wherein a laser which is emitted so as to enhance the refractive index of the core and the cladding is KrF eximer laser.

The invention according to a eighth aspect, in the fiber type optical component according to the seventh aspect, is a fiber type optical component wherein a periodic refractive index section is formed in the optical fiber so as to form an optical fiber grating.

The invention according to a ninth aspect, in the fiber type optical component according to the eighth aspect, is a fiber type optical component wherein a lattice vector of the grating is set to be non-zero degree towards the axis of the fiber.

As explained above, according to the present invention, by using the optical fiber which satisfies a relationship such as 24 [$\mu$m·wt %]<$\Sigma_k \beta_k d_k$<100 [$\mu$m·wt %] of germanium density in the light sensitive layer in the core and the cladding and making the amount of the alteration of the refractive index of the core and the cladding by the emission to be less than 0.002 at 674.9 nm wavelength, it becomes possible to obtain the fiber type optical component in which nonuniform refractive index alteration is small in cross section of the optical fiber with good optical property.

Also, by using the optical fiber which satisfies relation such as 0.35<exp($-2\Sigma_k \alpha_k d_k$) of the light sensitive layer in the core and the cladding and making the amount of the alteration of the refractive index of the core and the cladding by the emission of the ultraviolet light to be less than 0.002 at of 674.9 nm wavelength, it becomes possible to obtain a fiber type optical component in which nonuniform refractive index alteration is small in cross section of the optical fiber with good optical property.

Furthermore, by forming the optical fiber such that the outermost diameter of the light sensitive layer of the optical fiber is to be twice as large as the mode field diameter or more, and by forming a slant type optical fiber grating by this optical fiber, it is possible to realize a fiber type optical component in which the bandwidth of transmittance loss is narrow and steep in the reflection restricting angle with filtering ability having large transmittance loss.

DETAILED DESCRIPTION OF THE INVENTION

Preferred embodiments of the present invention are explained with reference to the drawings as follows.

Here, a fiber type optical component is explained with reference to slant short period grating (hereinafter called SSPG) having light sensitivity on a cladding.

Figure 1:
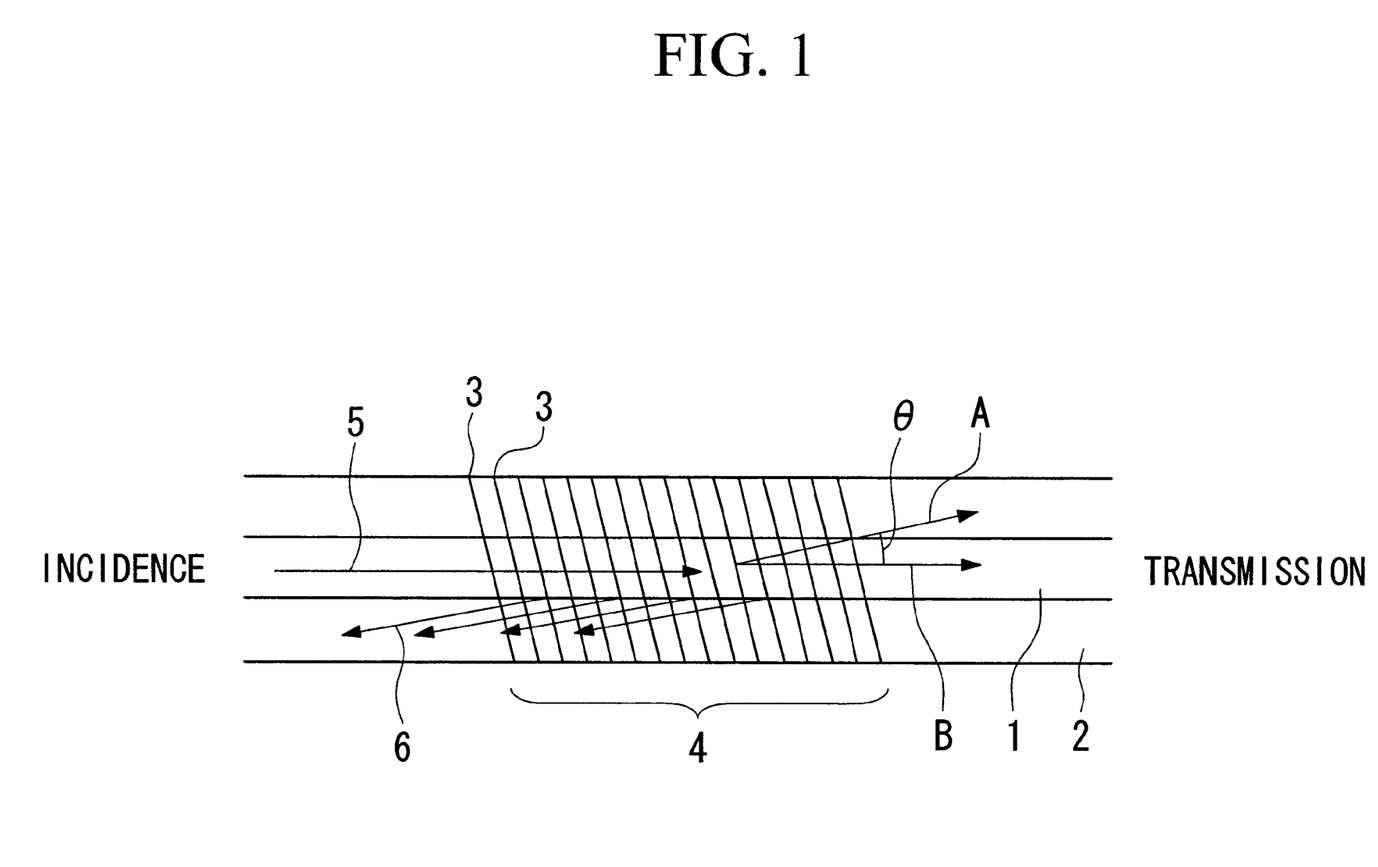
FIG. 1 is a cross section of the slant type short period optical fiber grating.

FIG. 1 is an example of a cross section of SSPG. In FIG. 1, a reference numeral 1 is a core, and a core 2 having a lower refractive index than core 1 is disposed around the core 1. The core 1 and the core 2 are made of quartz-type glass. A light sensitive dopant is added to the core 1 and the core 2 by emitting ultraviolet light having a predetermined wavelength so as to increase the refractive index of the quartz-type glass, and germanium is usually used as the dopant.

The ultraviolet light is emitted at a predetermined wavelength onto the quartz-type glass to which the germanium is added via a phase mask along the longitudinal direction of the core 1 and the core 2. The refractive index of the core 1 and the core 2 on which the ultraviolet light is emitted increases, and the grating section 4 on which a plurality of high refractive index sections 3 are disposed is formed. The high refractive index sections 3 are formed diagonally so as to cross the core 1 and so as not to cross the center axis B of the core 1 orthogonally. A plurality of high refractive index sections 3 are disposed along the longitudinal direction parallel to each other. On the SSPG, sections having high alternating ratio of refractive index modulation are made in the optical fiber at roughly one-third the wavelength of the operating wavelength.

Direction of a line A crossing the high refractive index sections 3 orthogonally is a lattice vector direction of the grating. The angle θ formed by the lattice vector direction and the center axis of the core 1 as a non-zero angle is a slant angle. The slant angle represents the amount of slant of the high refractive index section 3. In the SSPG, among the incident light 5, a part of the light reflected by the grating section 4 becomes the emitted light 6 to the cladding 2 and is combined with the a part of the mode of incident light going backward to the advancing direction of the incident light and in a direction towards the cladding section. Such a mode is hereinafter called a backward cladding mode. By doing this, the combination with a reflection mode going back in the core 1 decreases; thus, multiple reflection hardly occurs.

The light which is combined with the backward cladding mode is lost; thus, the SSPG is used as a filter for decreasing the predetermined light according to such a combination. Also, it is an advantage that the combination with the reflection mode can be restricted by setting the slant angle at a preferable value. The slant angle which can restrict the combination to the reflection mode is called the reflection restricting angle. Such an SSPG can be applied to a gain-flattening filter which flattens the gain of the optical amplifier.

Regarding such an SSPG, a simulation was performed in order to determined the outermost diameter of the cladding having light sensitivity satisfying predetermined conditions.

In case of the SSPG, it is known that the filtering ability improves when germanium is added to the cladding. More specifically, when germanium is added to the cladding, the bandwidth of the transmission loss becomes narrower and steeper in the reflection restricting angle; thus, the transmission loss of the filter can be increased.

In contrast, if the diameter of the cladding on which germanium is added is too large, inconvenience in that the increase of the refractive index when emitted is not uniform occurs. The effect on the filtering ability by altering the outermost diameter of the cladding on which germanium is added was tested under three conditions as shown in FIG. 1 as follows.

TABLE 1

| Condition | Core Radius: a ($\mu$m) | V value | MFD ($\mu$m) |
|---|---|---|---|
| 1 | 3.5 | 1.7 | 10.5 |
| 2 | 3.5 | 2.3 | 7.9 |
| 3 | 4.5 | 2.2 | 10.5 |

Figure 2A:
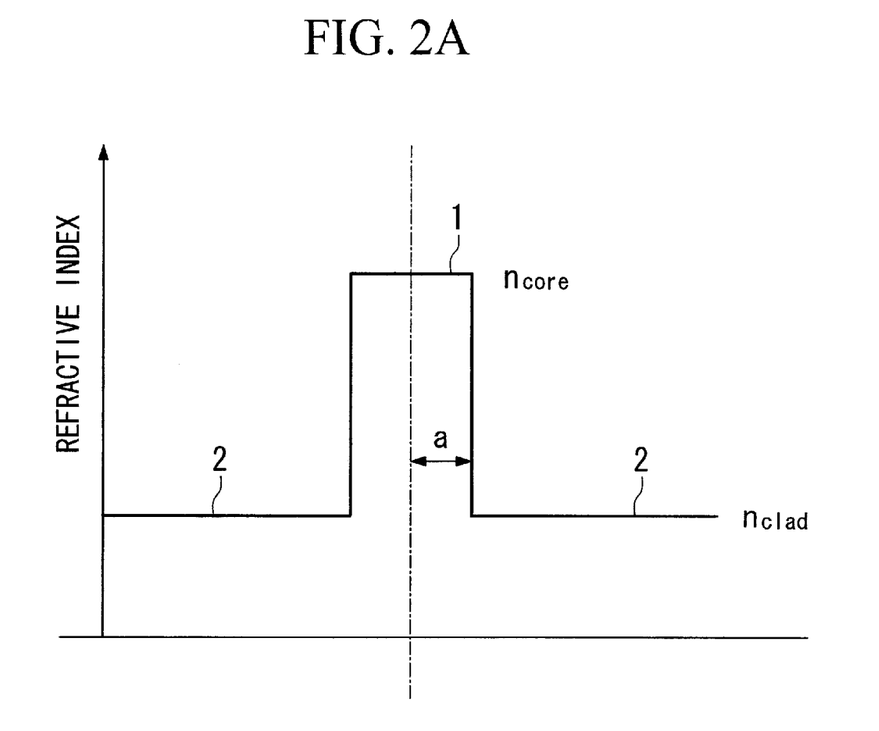
FIGS. 2A and 2B are graphs showing the refractive index and the light sensitivity of the core and the cladding of the optical fiber.
Figure 2B:
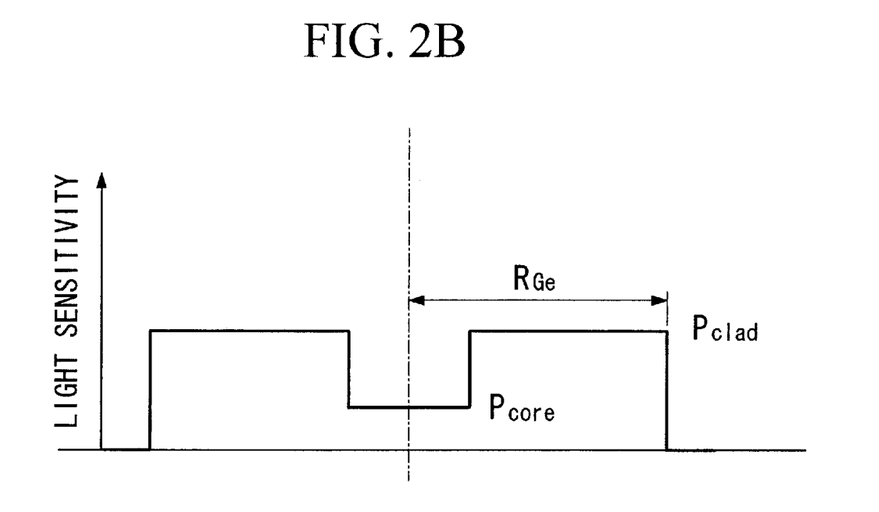

In FIGS. 2A and 2B, the refractive index and the light sensitivity of the core and the cladding of the optical fiber are shown. In FIG. 2A, reference numeral 1 indicates a core, reference numeral 2 indicates a cladding, reference "a" indicates the radius of the core. Also, $n_{core}$ is the refractive index of the core and the $n_{clad}$ is the refractive index of the cladding. In FIG. 2B, RGe is the outermost diameter of the layer having light sensitivity. $P_{core}$ is a light sensitivity of the core. $P_{clad}$ is a light sensitivity of the cladding. As far as the light sensitivity is concerned, the ratio of the core section and the cladding section is an important factor. This test was conducted under conditions such as $P_{core}/P_{clad}=0$, $P_{core}/P_{clad}=0.15$, $P_{core}/P_{clad}=0.3$. The "V value" in the TABLE 1 is an normalized frequency, and such an normalized frequency can be determined by formula 3 as follows.

$$V = \frac{2\pi}{\lambda} a(n_{core}^2 - n_{clad}^2).$$ Formula 3

In the formula 3, "$\lambda$" is the wavelength of the operation light. In this test, "$\lambda$" is set to 1550 nm. Also, "MFD" in the TABLE 1 is a mode field diameter value which indicates the diameter at a point where the electric field distribution of the guided mode becomes 1/e of the peak.

Figure 3A:
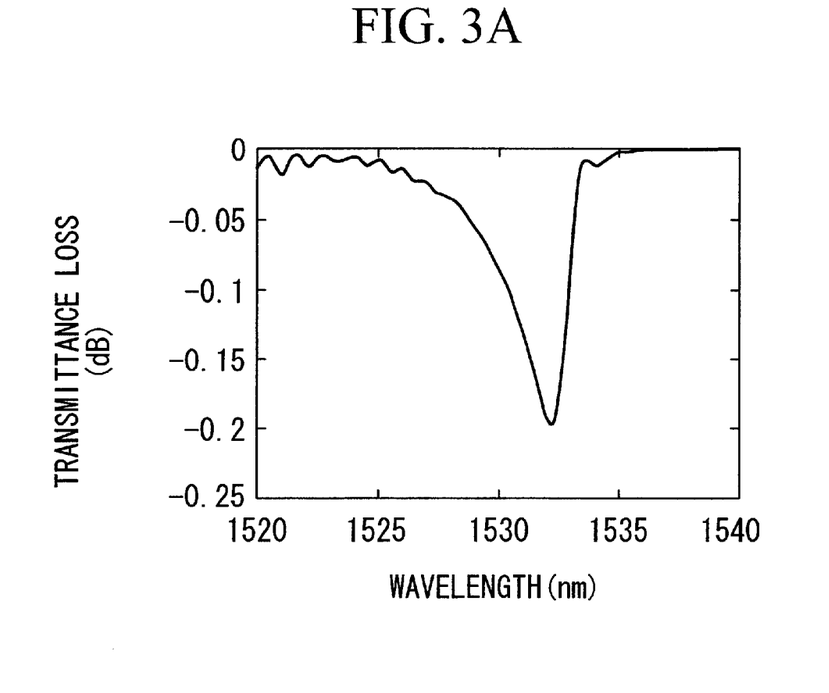
FIGS. 3A, 3B, 3C, and 3D are graphs showing the bandwidth of the transmittance loss of the slant type optical fiber grating when the outermost diameter of the light sensitive layer of the optical fiber changes.
Figure 3B:
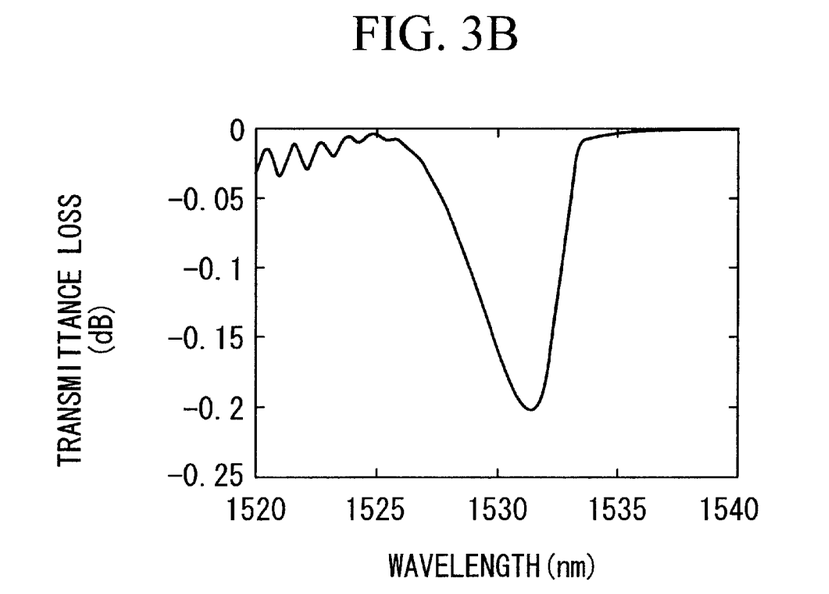
Figure 3C:
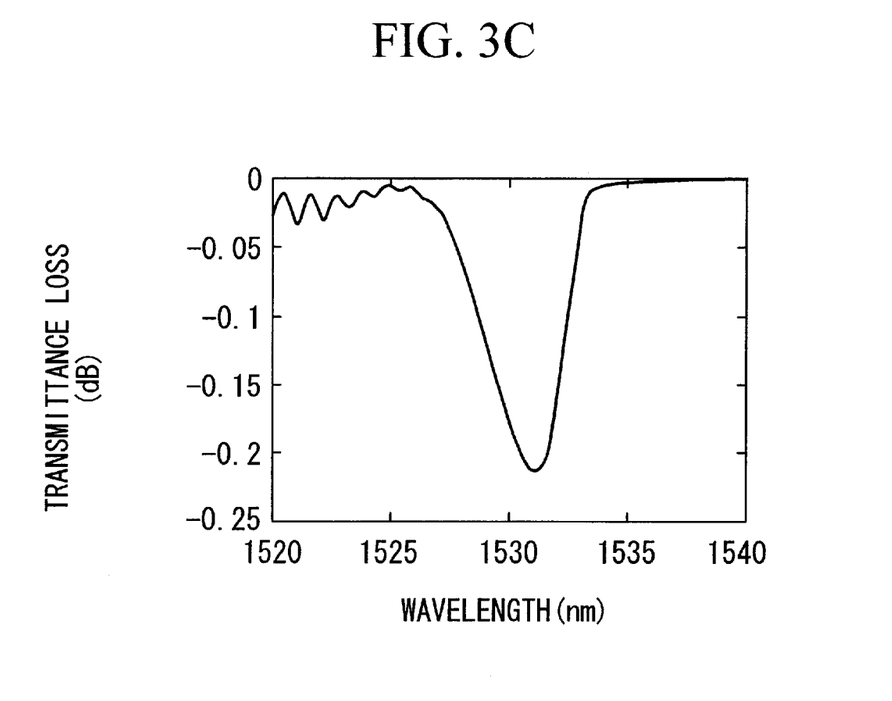
Figure 3D:
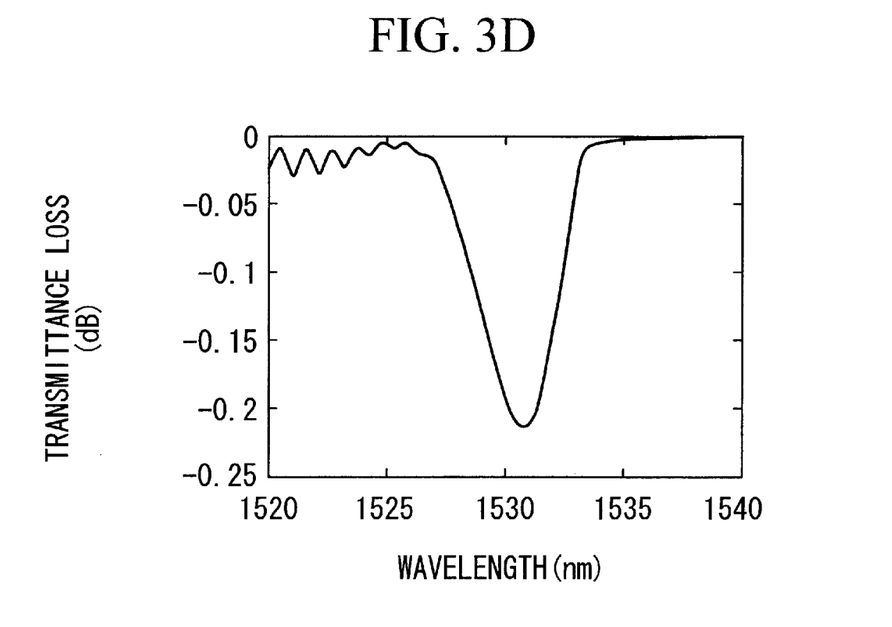
Figure 4:
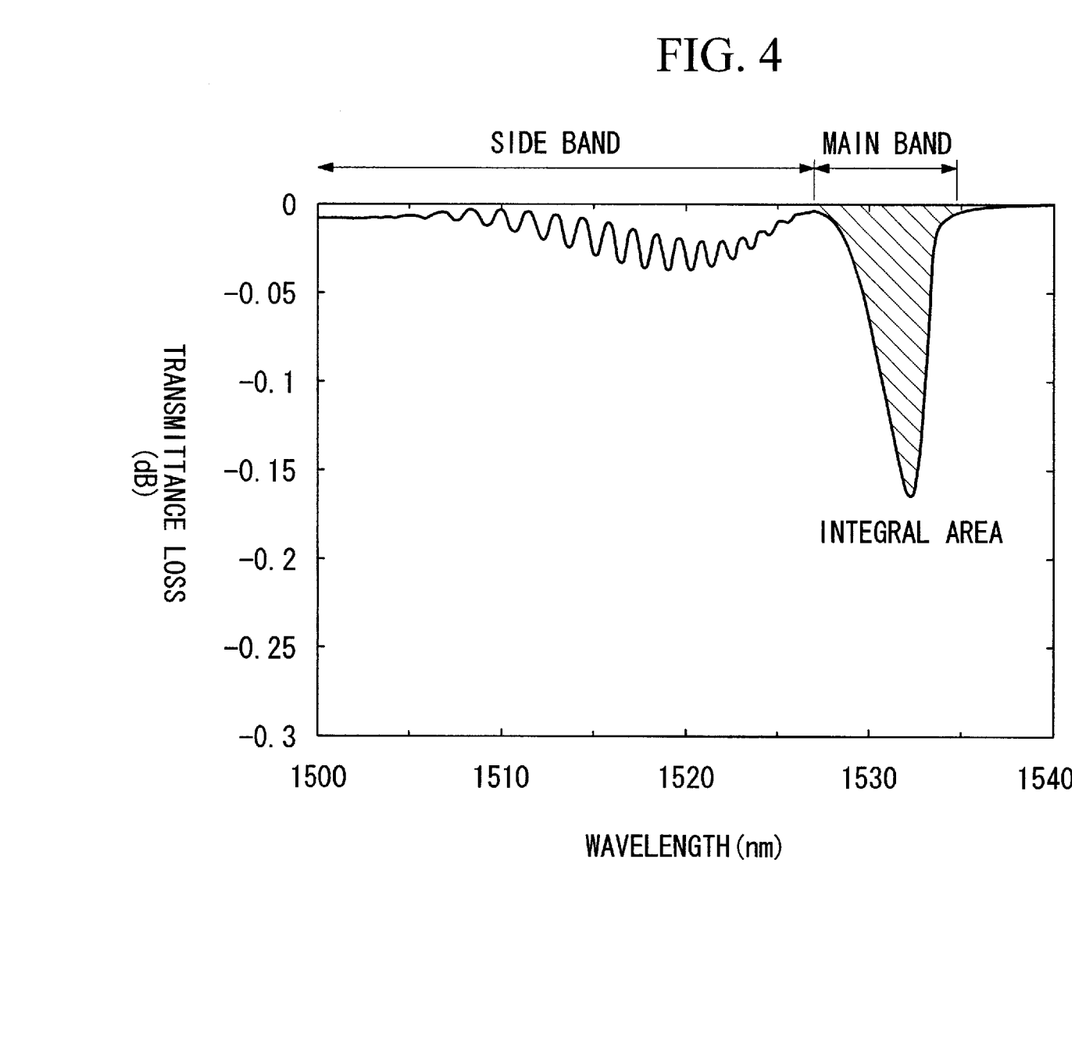
FIG. 4 is a graph showing the area of the transmittance loss of the bandwidth of the transmittance loss of the slant type optical fiber grating.

In the calculation of each testing condition, slant angle is set to be the reflection restricting angle when the diameter RGe of the cladding on which germanium is added is 30 $\mu$m. Also, the alterations of the average of the refractive index on the cladding section were fixed to 0.001. The results of the calculations are shown in FIGS. 3A to 3D. In FIGS. 3A to 3D, the case in which the ratio of the light sensitivity of the core and the light sensitivity of the cladding is 0.15 under condition 1 of TABLE 1 (a=3.5, V=1.7, MFD=10.5) is shown. Also, in this case, FIG. 3A is the case in which RGe=6 $\mu$m, FIG. 3B is the case in which RGe=9 $\mu$m, FIG. 3C is the case in which RGe=12 $\mu$m, FIG. 3D is the case in which RGe=15 $\mu$m. As shown in FIGS. 3A to 3D, it is understood that the form of the transmission loss is deteriorated when RGe decreases. In order to perform quantitative analysis of such deterioration, the area of transmission loss as shown in FIG. 4 is determined under each testing condition, and the deterioration is shown in FIGS. 5 to 7 as follows.

Figure 5:
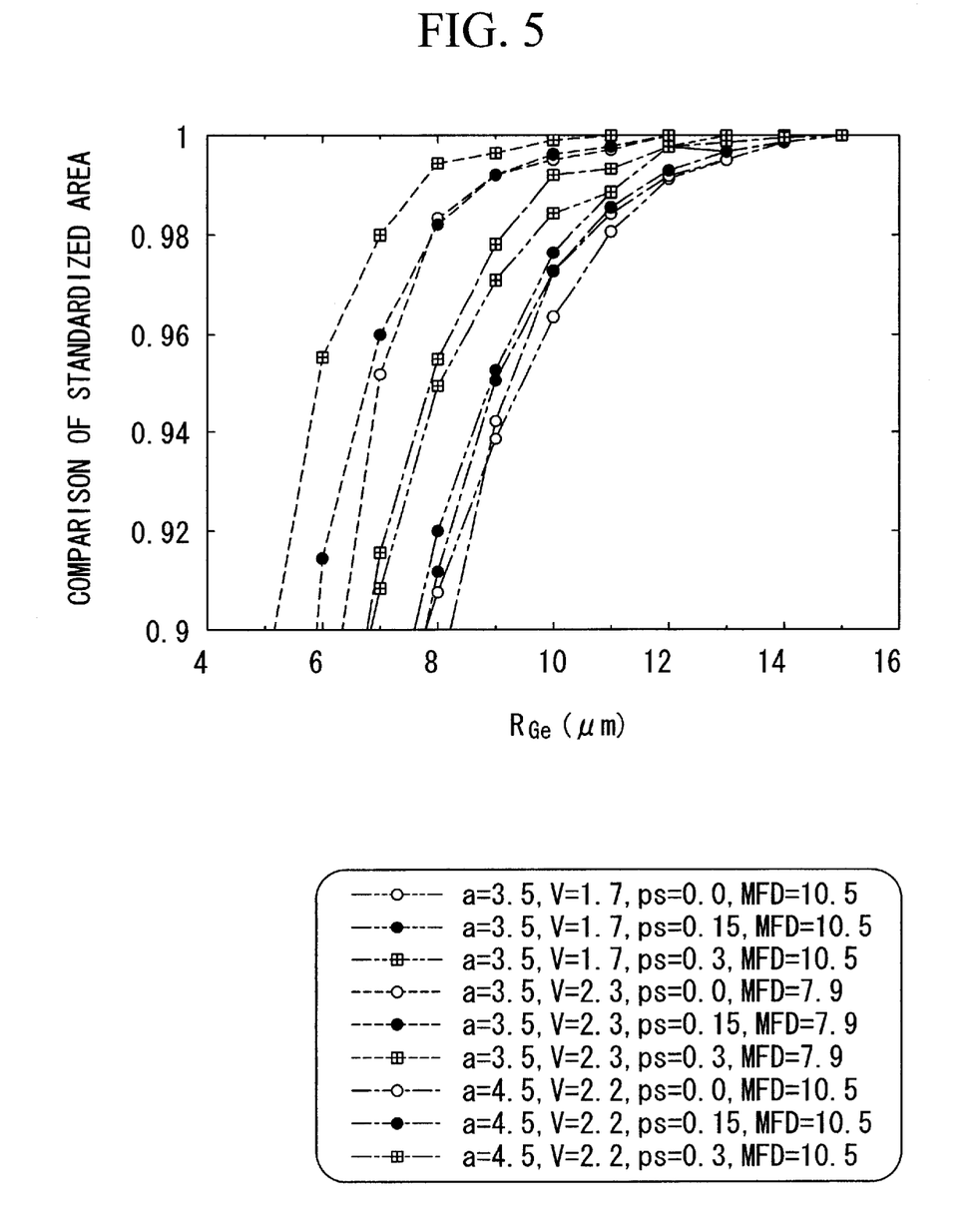
FIG. 5 is a graph showing the relationship of the area of the standardized transmittance loss and the outermost diameter of the light sensitive layer.
Figure 6:
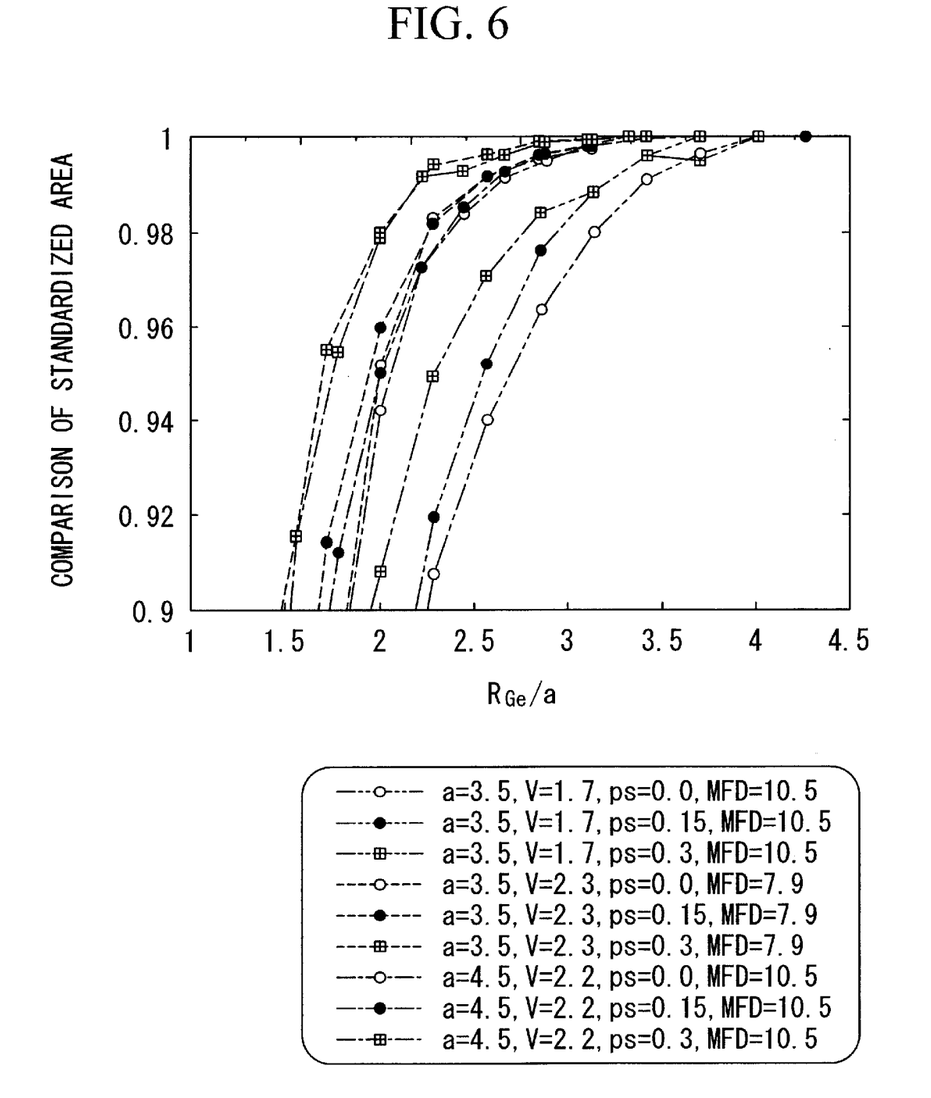
FIG. 6 is a graph showing the relationship of the area of the standardized transmittance loss and the value such as "outermost diameter of the light sensitive layer/core diameter".
Figure 7:
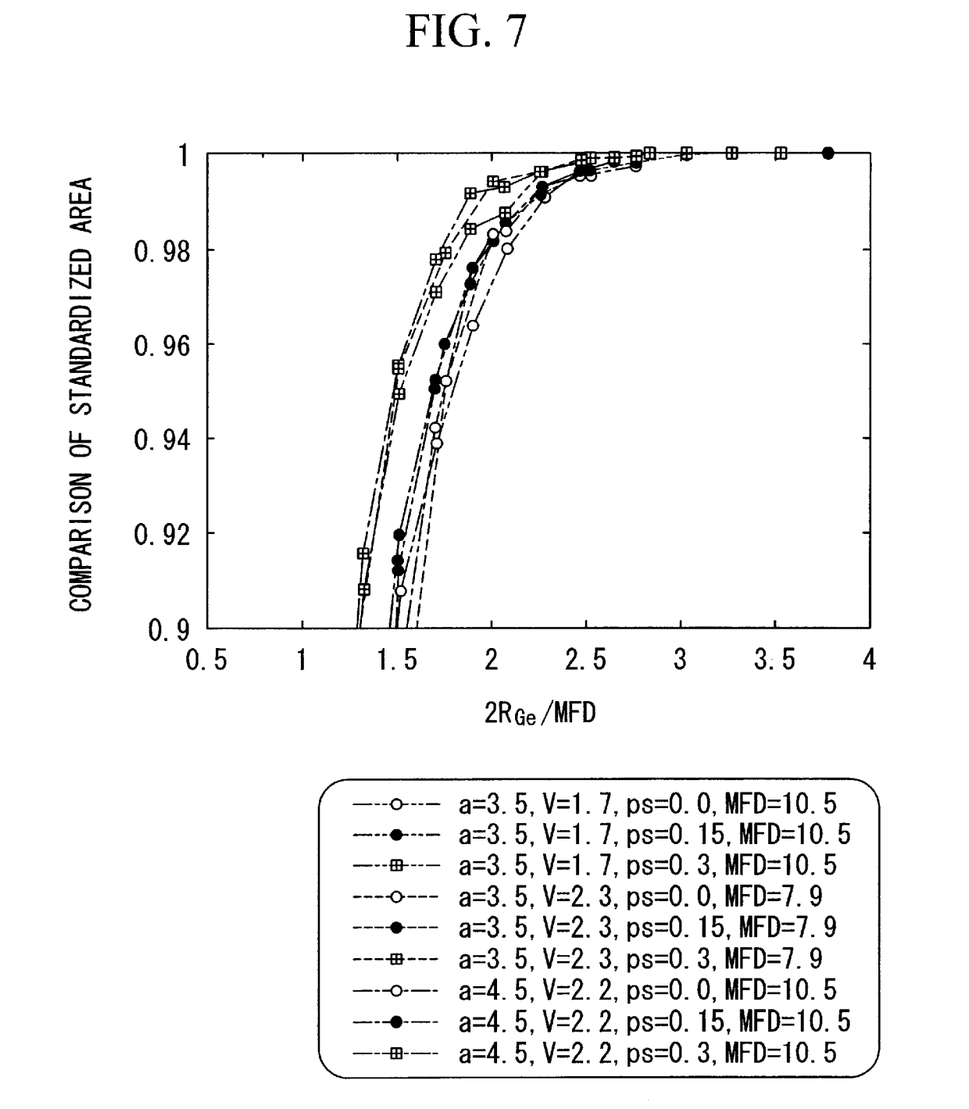
FIG. 7 is a graph showing the relationship of the area of the standardized transmittance loss and the value such as "outermost diameter of the light sensitive layer/mode field".

The areas of transmission loss shown in FIGS. 5 to 7 are standardized as area of transmission loss under the condition in which RGe=30 $\mu$m. FIG. 5 is a case in which the horizontal axis indicates RGe. FIG. 6 is a case in which a horizontal axis indicates RGe/a. FIG. 7 is a case in which the horizontal axis indicates 2RGe/MFD. As shown in FIGS. 5 and 6, the ratio of the standardized area changes according to the structural condition of the fiber; thus, compatible conditions which correspond to all fibers cannot be found.

In contrast, as shown in FIG. 7, it was observed that the similar characteristics were exhibited by allowing the horizontal axis indicated by 2RGe/MFD even if fiber parameter alters. That is, regarding the diameter RGe of the outermost diameter of the layer having light sensitivity, it was found that the optimum value for corresponding to all kinds of fiber structures can be obtained from the view point of MFD value as a standard. Also, it was found that more than 96% of transmission loss area can be obtained if the outermost diameter 2RGe of the light sensitive layer is 2 times as large as the MFD or more. Therefore, it was found that characteristics hardly improve even if the 2RGe is made more than 2 times the MFD, and there is no advantage in making it more than 3 times the MFD.

Accordingly, it is preferable that the outermost diameter of the light sensitive layer of the optical fiber be more than twice the diameter of the mode field. Preferable characteristics can be obtained if the outermost diameter of the light sensitive layer of the optical fiber less than three times the diameter of the mode field.

Next, the effect on the increasing of the refractive index on the light sensitive layer due to the absorption of ultraviolet light when ultraviolet light is emitted thereon is explained as follows.

Usually, an optical fiber has a structure in which a plurality of layers is formed concentrically, and the optimum structure for the requirement can be obtained by altering the refractive index and the light sensitivity of each layer. In this explanation, the thickness of each layer in the radius direction is $d_k$, and the absorption coefficient at the layer is $\alpha_k$. Here, "k" indicates the number of the layer. Also, the absorption coefficient $\alpha$ indicates the amount of absorbed light per unit length defined as T1/T0=exp($-\alpha$d). Absorption coefficient $\alpha$ has a dimension of a reciprocal number of the length. Here, T0 indicates light power which is incident on the absorption layer, "d" indicates thickness of the layer, and T1 indicates the intensity of the emitted light after being decreased by the absorption layer.

Here, explanation is made of the case in which the incident light from the side of the fiber passes the center of the fiber. The incident light is absorbed by each layer, and the intensity of the incident light is multiplied according to the formula such as "exp $(-\alpha_k d_k)$"; thus, the power of the light which passes each layer and reaches to the opposite side of the emitted surface on the fiber can be indicated by formula 4 as follows.

$$\frac{T_{out}}{T_{in}} = \exp\left(-2\sum_k a_k d_k\right)$$ Formula 4

In formula 4, $T_{in}$ indicates incident light power to the optical fiber, and $T_{out}$ indicates emitting light power. The concept of such a formula is examined as follows. For a usual fiber, germanium is added as a light sensitive material. Quartz type fiber exhibits light sensitivity to light having a wavelength of approximately 248 nm by adding germanium. For a light for emission, a KrF eximer laser and a second-harmonic wave of an Ar laser should preferably be used. In this embodiment, a KrF eximer laser having a wavelength of 248 nm is used as a emitting light source. When absorption coefficient per 1 (one) wt % of $GeO_2$ is $\alpha_{Ge}$, and density of $GeO_2$ on each layer is $\beta_k$ (wt %), the formula 4 can be converted to a formula 5 as follows.

$$\frac{T_{out}}{T_{in}} = \exp\left(-2\alpha_{Ge}\sum_{k}\beta_k d_k\right) \quad \text{Formula 5}$$

Figure 8:
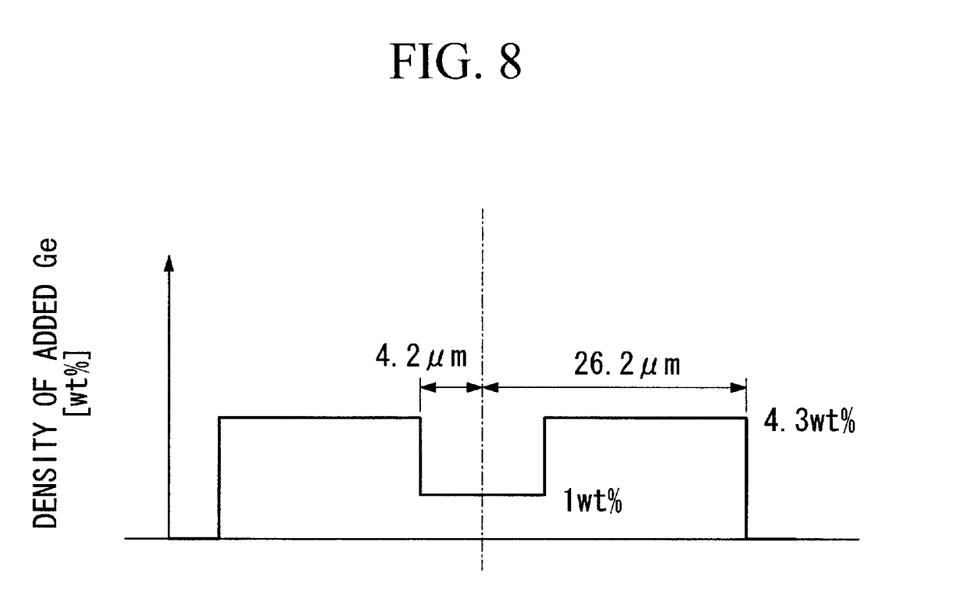
FIG. 8 is a graph showing an example of the density of added germanium in the light sensitive layer of the optical fiber.

According to published documents such as "Applied Optics, Vol. 34, No. 18, 3436–3440 (hereinafter called reference document 1)" and "Electronics Letters, Vol. 28, No. 18, 1743–1744 (hereinafter called reference document 2)", it is reported that the absorption coefficient of quartz on which germanium is added in the 248 nm bandwidth is indicated as $\alpha_{Ge}$=40 to 55 cm$^{-1}$ per 1 (one) wt % of $GeO_2$ density. Under such conditions, the increase of the refractive index of the fiber to which germanium is added was observed as shown in FIG. 8. As far as this optical fiber is concerned, the conditions are that the light sensitivity of the core: $P_{core}$=1 wt %, the light sensitivity of the cladding: $P_{clad}$=4.3 wt %, diameter of the core: a=4.2 μm, and the outermost diameter of the light sensitive layer of the cladding: RGe=26.2 μm. Formula 6 is obtained if this condition is applied to formula 5 as follows.

$$\frac{T_{out}}{T_{in}} = \exp(-2\alpha_{Ge}(22\times 4.3 + 4.2\times 1)) \approx \exp(-2\alpha_{Ge}\times 100) \quad \text{Formula 6}$$

As is understood from the above, it is preferable that the light sensitive layer satisfy a relationship such as $\Sigma_k \beta_k d_k < 100$ [μm·wt %]. If the value of $\alpha_{Ge}$ is supposed to be 40 to 55 cm$^{-1}$ according to the reference document 1 and 2, transmittance of the incident light is 33.5 to 45%. The increase of the refractive index after the KrF eximer laser light is emitted on the optical fiber is shown in FIGS. 9A to 9D. The refractive index distribution was measured by an RNF method (refracted near-field method) which is a standard measuring method of the JIS (Japan Industrial Standard) and the ITU-T (Telecommunication Standardization Sector of the International Telecommunications Union). In this embodiment, a semiconductor laser is used as the source of the measuring light. The wavelength of the measuring light is 674.9 nm; thus, the refractive index and the alteration of the refractive index to be measured in this embodiment become 674.9 nm in wavelength. Also, when the refractive index of the optical fiber such as optical fiber grating changes periodically in the longitudinal direction, the change of the refractive index is determined as an average of the refractive index in the longitudinal direction.

Figure 9A:
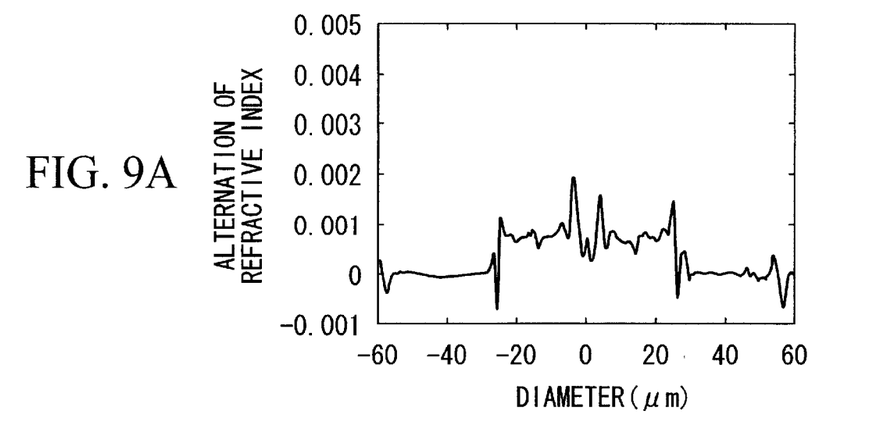
FIGS. 9A, 9B, and 9C are graphs showing an example of refractive index distribution of the light sensitive layer at the time of emission of ultraviolet light to the optical fiber.
Figure 9B:
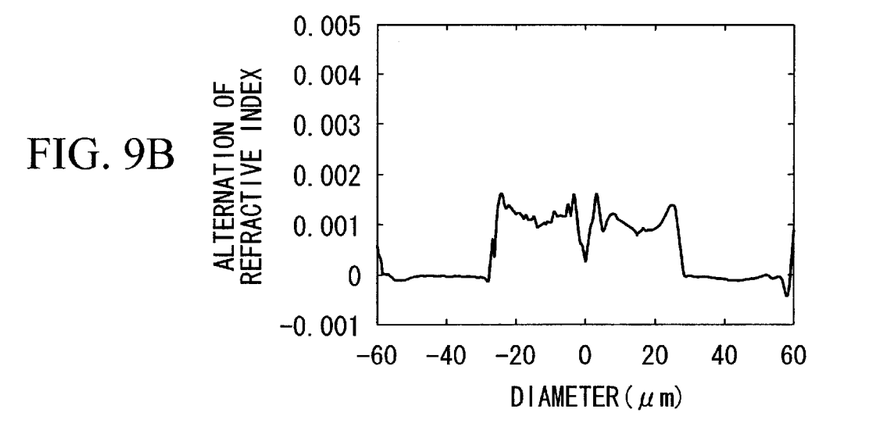
Figure 9C:
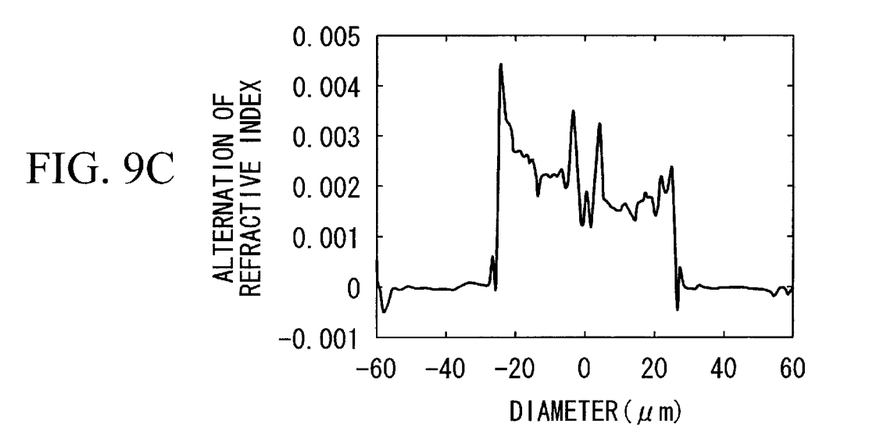

FIG. 9A shows the alteration of the refractive index under conditions in which the power density per one pulse: 1.7 mJ/mm2, repetition frequency: 60 Hz, and emission time: 100 seconds. In this case, the change of the refractive index is as large as 0.0008. FIG. 9B shows the change of the refractive index under conditions in which the power density per one pulse: 2.7 mJ/mm$^2$, repetition frequency: 60 Hz, and emission time: 50 seconds. In this case, the change in the refractive index is as large as 0.001. FIG. 9C shows the change of the refractive index under conditions in which the power density per pulse: 2.7 mJ/mm$^2$, repetition frequency: 60 Hz, and emission time: 100 seconds. In this case, the change of the refractive index is as large as 0.002 only in the center of the core. In any cases, the refractive index is determined under condition that the light is emitted on the optical fiber from the left-hand side of the drawing.

As will be understood from FIGS. 9A and 9B, it was not observed that the refractive index of only the left-hand side of the optical fiber increased remarkably. However, according to FIG. 9C, it was observed that the refractive index of only the left-hand side of the optical fiber increased remarkably. Therefore, nonuniform increase of the refractive index by the emission can be observed. That is, in the optical fiber having 35% of transmittance of the emission in the side direction, if the amount of the change of the refractive index by the emission is as much as 0.001, nonuniform increase of the refractive index does not occur. If the ultraviolet light is emitted until the amount of the change of the refractive index becomes as large as 0.002 or more, it was observed that the nonuniform refractive index occurs.

Therefore, the increase in change of the refractive index should preferably be restricted to less than 0.002 when a fiber type optical component such as a grating is manufactured. It is more preferable that the increase in change of the refractive index be restricted to less than 0.001.

The refractive index in such a range can be obtained by taking the added amount of germanium into account and setting the power density per pulse, repetition frequency, and emission time properly. For example, in the optical fiber having 4 wt % density of germanium, the repetition frequency and the emission time should preferably be set so that the total emitting amount is 15 J/mm$^2$ or less when the power density per pulse is 1.7 mJ/mm$^2$. Similarly, the repetition frequency and the emission time should preferably be set so that the total emitting amount is 13 J/mm$^2$ or less when the power density per pulse is 2.7 mJ/mm$^2$.

According to the above experiment, it was observed that the optical fiber grating in which nonuniform increase of the refractive index is restricted can be manufactured in the optical fiber having a light sensitive layer on the cladding, when the thickness of each layer of the optical fiber is $d_k$, $GeO_2$ density is $\beta_k$ [wt %] with a setting of $\Sigma_k \beta_k d_k < 100$ [μm·wt %], and if the amount of the change of the refractive index is less than 0.002, more preferably, less than 0.001. The transmittance of the emission from the side of the optical fiber is almost 35%.

Also, the MFD of the usual fiber is at least 8 μm. Therefore, the outermost diameter after addition of germanium requires as much as 8×2=16 μm if the diameter is predetermined to be 2 times as large as mode field diameter. In order to obtain sufficient refractive index change, more than 3.0 wt % of $GeO_2$ needs to be added on the light sensitive layer. According to this, a relationship such as $\Sigma_k \beta_k d_k$=16/2×3=24 μm·wt % is effective. That is, in the case of an optical fiber in which germanium is added to the cladding layer, a relationship such as $\Sigma_k \beta_k d_k \geq 24$ μm·wt % should preferably be satisfied.

In the above explanation, an example of an optical fiber grating is explained. However, this invention is not limited to the case of the fiber grating. This invention can be applied to other optical components as long as the optical components are made by employing the effect of increase of refractive index by emitting ultraviolet light from the side direction of the fiber.

According to this example of the fiber type optical component, by using the optical fiber which satisfies the relationship such as 24 [μm·wt %]<$\Sigma_k\beta_k d_k$<100 [μm·wt %] of germanium density in the light sensitive layer in the core and the cladding and making the amount of the change of the refractive index of the core and the cladding by the emission to be less than 0.002 at of 674.9 nm wavelength, it becomes possible to obtain the fiber type optical component in which non uniform refractive index change is small in cross section in an optical fiber with good optical property.

Also, by using the optical fiber which satisfies the relationship such as 0.35<exp($-2\Sigma_k\alpha_k d_k$) of the light sensitive layer in the core and the cladding and making the amount of the change of the refractive index of the core and the cladding by the emission of the ultraviolet light to be less than 0.002 at 674.9 nm wavelength, it becomes possible to obtain the fiber type optical component in which non uniform refractive index change is small in cross section of the optical fiber with good optical property.

Furthermore, by forming the optical fiber such that the outermost diameter of the light sensitive layer of the optical fiber to be twice as large as the mode field diameter or more, and by forming a slant type optical fiber grating by this optical fiber, it is possible to realize a fiber type optical component in which the bandwidth of transmittance loss is narrow and steep in the reflection restricting angle with a filtering ability having large transmittance loss.

What is claimed is:

1. A fiber type optical component comprising:

a core;

a cladding; and a refractive index enhancing section, wherein the core and the cladding have light sensitivity, the refractive index enhancing section is formed by emitting ultraviolet light on an optical fiber, the density of germanium in a layer having light sensitivity on the core and the cladding in the optical fiber satisfies formula 1 such as $$24[\mu m \cdot wt \ \%] < \sum_k \beta_k d_k < 100[\mu m \cdot wt \ \%],$$

the amount of change of refractive index of the core and the cladding by the emission of ultraviolet light is less than 0.002 at 674.9 nm wavelength.

2. A fiber type optical component comprising:

a core;

a cladding; and a refractive index enhancing section, wherein the core and the cladding have light sensitivity, the refractive index enhancing section is formed by emitting ultraviolet light on an optical fiber, a layer having light sensitivity on the core and the cladding in the optical fiber satisfies formula 2

$$0.35 < \exp\left(-2\sum_k \alpha_k d_k\right), \text{ and}$$

and the amount of change of refractive index of the core and the cladding by the emission of ultraviolet light is less than 0.002 at 674.9 nm wavelength.

3. A fiber type optical component according to on of claims 1 and 2, wherein amount of change of refractive index of the core and the cladding is less than 0.001 in wavelength bandwidth of 674.9 nm.

4. A fiber type optical component according to claim 3, wherein the diameter of the outermost layer on the optical fiber to which light sensitive material is applied twice as large as the diameter of mode field.

5. A fiber type optical component according to one of claim 4, wherein the diameter of the outermost layer on the optical fiber to which light sensitive material is applied 3 times as large as the diameter of mode field.

6. A fiber type optical component according to claim 5 wherein the light sensitive material is germanium.

7. A fiber type optical component according to claim 6 wherein a laser which is emitted so as to enhance the refractive index of the core and the cladding is a KrF eximer laser.

8. A fiber type optical component according to claim 7 wherein a periodical refractive index section is formed in the optical fiber so as to form an optical fiber grating.

9. A fiber type optical component according to claim 8 wherein a lattice vector of the grating is set to be non-zero degree toward an axis of the fiber.

* * * * *

UNITED STATES PATENT AND TRADEMARK OFFICE
CERTIFICATE OF CORRECTION

PATENT NO.     : 6,594,423 B2  Page 1 of 1
DATED          : July 15, 2003
INVENTOR(S)    : Akira Sakamoto et al.

It is certified that error appears in the above-identified patent and that said Letters Patent is hereby corrected as shown below:

<u>Title page,</u>
Item [75], Inventors, delete "Sudo Masaaki" and substitute with -- Masaaki Sudo --

Signed and Sealed this

Twenty-seventh Day of January, 2004

JON W. DUDAS
*Acting Director of the United States Patent and Trademark Office*